United States Patent [19]
Groves et al.

[11] Patent Number: 5,325,942
[45] Date of Patent: Jul. 5, 1994

[54] TUNABLE HYDRAULIC VALVE FOR SHOCK ABSORBER

[75] Inventors: Gary W. Groves; David T. Boucher, both of Monroe, Mich.

[73] Assignee: Monroe Auto Equipment Company, Monroe, Mich.

[21] Appl. No.: 669,645

[22] Filed: Mar. 14, 1991

[51] Int. Cl.⁵ .............................................. F16F 9/50
[52] U.S. Cl. .................................... 188/282; 188/315; 188/322.14; 188/322.15
[58] Field of Search ........... 188/315, 317, 320, 322.15, 188/322.17, 322.22, 280, 281, 322.14, 282

[56] References Cited

U.S. PATENT DOCUMENTS

| | | | |
|---|---|---|---|
| 3,722,639 | 3/1973 | Keijzer et al. | 188/315 |
| 3,874,487 | 4/1975 | Keijzer et al. | 188/322 |
| 3,991,862 | 11/1976 | Tanabe | 188/282 |
| 4,034,860 | 7/1977 | Leppich | 188/282 |
| 4,076,276 | 2/1978 | Wijnhoven | 280/714 |
| 4,083,437 | 4/1978 | Leppich | 188/322 |
| 4,460,074 | 7/1984 | Müller et al. | 188/322.14 |
| 4,512,447 | 4/1985 | Miura | 188/322.15 |
| 4,614,255 | 9/1986 | Morita et al. | 188/315 |
| 4,721,130 | 1/1988 | Hayashi | 188/322 |
| 4,782,925 | 11/1988 | Grundei | 188/315 X |
| 4,809,828 | 3/1989 | Nakazato | 188/322.15 |
| 4,895,229 | 1/1990 | Kato | 188/317 X |
| 5,042,624 | 8/1991 | Furuya et al. | 188/280 |

FOREIGN PATENT DOCUMENTS

| | | | |
|---|---|---|---|
| 0113333 | 6/1984 | Japan | 188/322.15 |
| 0097740 | 4/1990 | Japan | 188/280 |
| 0195039 | 8/1990 | Japan | 188/322.15 |
| 2225409 | 5/1990 | United Kingdom | 188/322.15 |

Primary Examiner—Robert J. Oberleitner
Assistant Examiner—Peter M. Poon
Attorney, Agent, or Firm—Harness, Dickey & Pierce

[57] ABSTRACT

A novel tunable hydraulic valve assembly, adaptable to a standard direct acting hydraulic shock absorber, variably responsive to a plurality of selected ranges of fluid pressure differentials to provide a plurality of fluid flow paths between fluid containing portions of the shock absorber, and a method for achieving same, is disclosed. The valve assembly comprises a plurality of deflectable valve disks with flow ports, in stacked abutting relationship whereby selected ranges of fluid pressure differentials deflect variable numbers of valve disks providing varying fluid flow paths therebetween. The valve assembly of the present invention is shown to be adapted to use in both the piston, tunably affecting fluid flow between portions of the pressure cylinder on either side of a reciprocable piston disposed therein, and the base valve assembly, tunably affecting fluid flow between the pressure cylinder and the fluid reservoir.

8 Claims, 6 Drawing Sheets

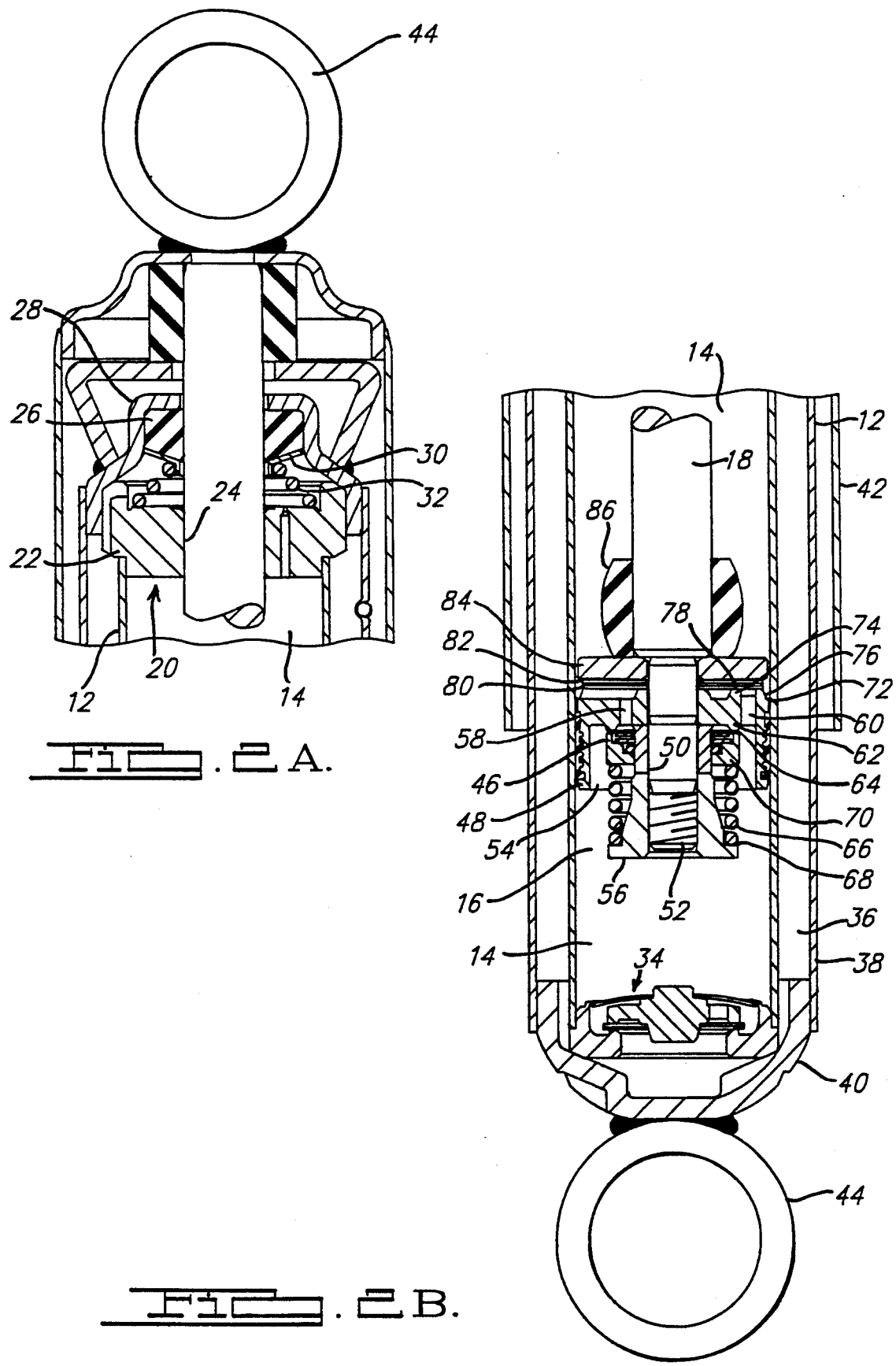

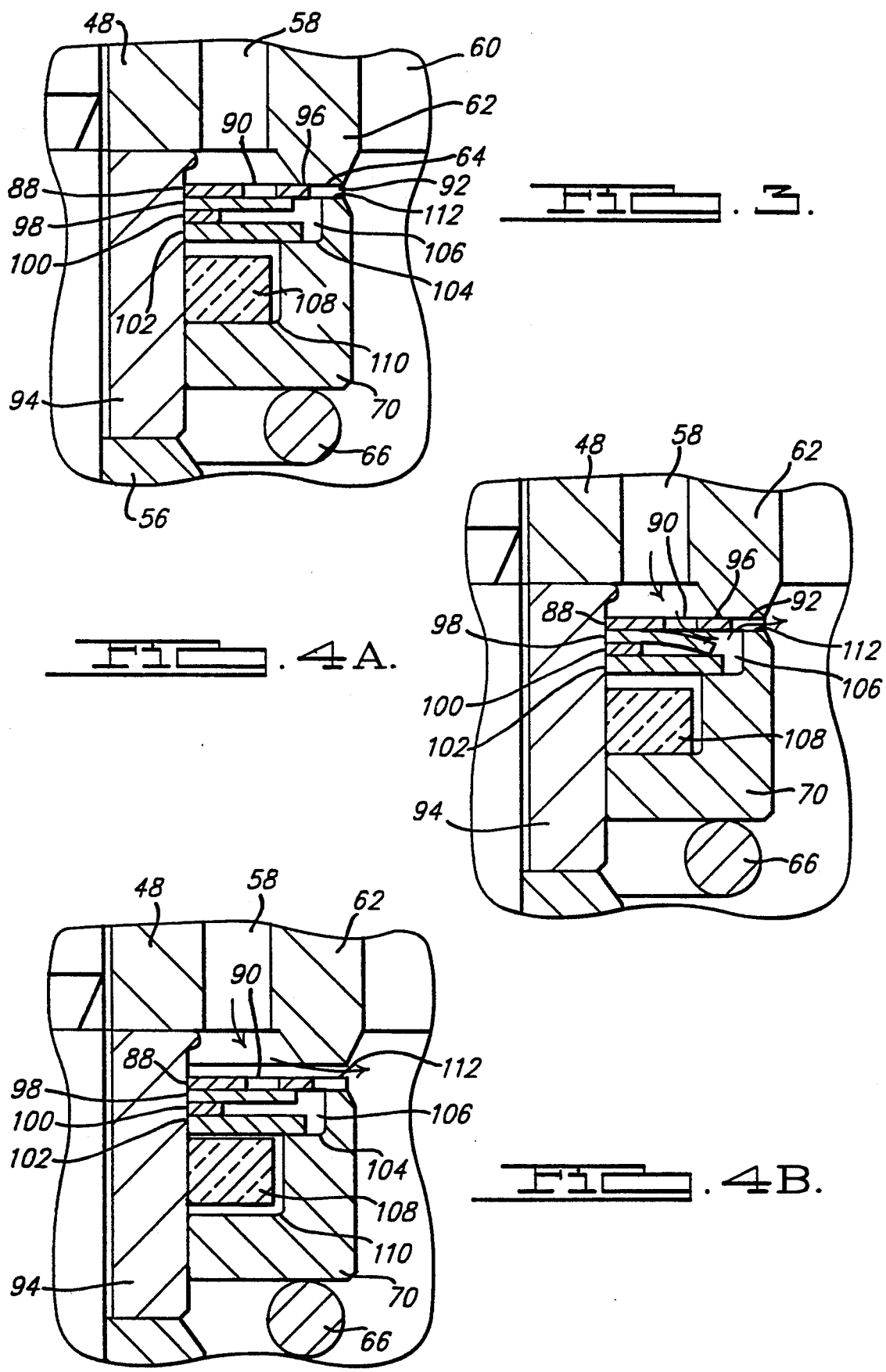

TUNABLE HYDRAULIC VALVE FOR SHOCK ABSORBER

BACKGROUND AND SUMMARY OF THE INVENTION

This invention relates generally to vehicular shock absorbers and, more particularly, to a new and improved piston construction for direct acting telescopic shock absorbers or struts. Even more particularly, this invention relates to a novel hydraulic valve assembly which allows greater tunability of the shock absorber, especially in the mode of low hydraulic fluid flow, than is presently available in standard shock absorbers known in the art, to achieve a desired ride characteristic for the associated vehicle.

It is accordingly a general object of the present invention to provide a new and improved shock absorber construction.

It is a more particular object of the present invention to provide an improved shock absorber construction which embodies the novel tunable hydraulic valve assembly of the present invention therein.

It is another object of the present invention to provide an improved shock absorber which allows greater tunability, especially in a mode of low hydraulic fluid flow, for achieving the desired ride characteristic.

Other objects and advantages of the present invention will become apparent from the following detailed description taken in conjunction with the accompanying drawings.

BRIEF DESCRIPTION OF THE DRAWINGS

FIG. 2A is a cross sectional view of the top portion of a vehicle shock absorber construction.

FIG. 2B is a cross sectional view of the lower portion of a vehicle shock absorber construction incorporating the hydraulic valve assembly of the present invention.

FIG. 3 is an enlarged cross-sectional view of the tunable hydraulic valve assembly shown in FIG. 2B.

FIG. 4A is an enlarged cross-sectional view of the tunable hydraulic valve assembly shown in FIG. 3, showing hydraulic fluid flow when the flow is relatively low.

FIG. 4B is an enlarged cross-sectional view of the tunable hydraulic valve assembly shown in FIGS. 3 and 4A showing hydraulic fluid flow relatively higher than the fluid flow shown in FIG. 4A.

DETAILED DESCRIPTION OF A PREFERRED EMBODIMENT

Figure 1:
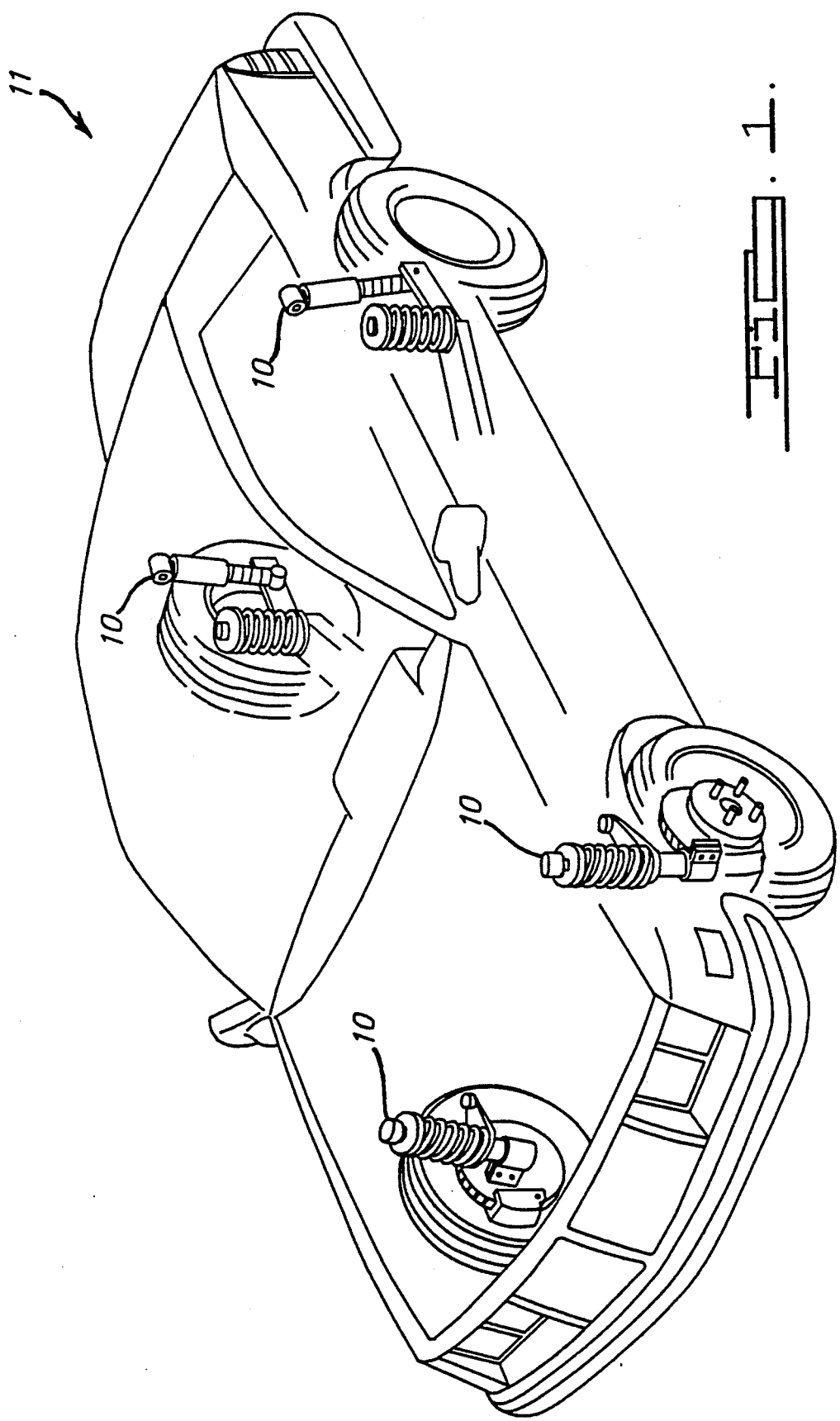
FIG. 1 is a schematic view of an automobile body showing the general location of the shock absorbers embodying the hydraulic valve assembly of the present invention.

In FIG. 1, a plurality of four shock absorbers 10 according to the preferred embodiment of the present invention are shown. The shock absorbers 10 are depicted in operative association with a diagrammatic representation of a conventional automobile 11. As shown in FIGS. 2A and 2B, each of the shock absorbers 10 comprise a hydraulic fluid containing working chamber 14. Disposed within the chamber 14 is a reciprocable piston 16 that is secured to one end of an axially extending piston rod 18. The piston rod 18 is supported and guided for movement within the pressure cylinder 12 by means of a combination fluid seal and rod guide assembly 20 located in the upper end of the cylinder 12. The fluid seal and rod guide assembly 20 includes a piston rod guide member 22 which is formed with a reduced diameter lower end portion extending into the upper end of the cylinder 12 and secured in sealed relationship thereto. The guide member 22 is formed with a central axial extending bore 24 which snugly fits the piston rod 18 as the latter operates or reciprocates relative thereto. A resilient elastomeric seal 26 surrounds the piston rod 18 and is confined within an upper end cap 28 by means of a retaining element 30 and a coil spring 32, the seal 26 serving to prevent the ingress of foreign material into the shock absorber 10 and to prevent the egress of any hydraulic actuating fluid therefrom.

A base valve, generally designated by the numeral 34, is located within the lower end of the pressure cylinder 12 and functions to control hydraulic fluid communication between the working chamber 14 and a fluid reservoir 36 that is defined between the outer periphery of the cylinder 12 and the inner periphery of a tubular reserve tube 38 which is arranged concentrically around the exterior of the pressure cylinder 12. Where the novel tunable valve assembly of the present invention is adapted to the lower end of the piston rod 18, the base valve 34 may be of a construction and operation of the type shown and described in U.S. Pat. No.

3,771,626, which patent is incorporated by reference herein. Alternatively, the novel tunable valve assembly of the present invention may also be adapted to the base valve 34 and such an alternative embodiment of the invention is also described below.

The upper and lower ends of the shock absorber 10 are provided with generally cup-shaped upper end caps 28 and lower end cap 40, respectively, which are secured, as by welding, to the opposite ends of the reserve tube 38 as illustrated. The shock absorber 10 is shown as being provided with a dirt shield 42 which is secured at its upper end to the upper end of the piston rod 18, and suitable end fittings 44 are secured to the upper end of the piston rod 18 and the lower end cap 40 for operatively securing the shock absorber 10 between the sprung and unsprung portions of an automotive vehicle. As will be appreciated by those skilled in the art, upon reciprocal movement of the piston rod 18 and piston 16 carried therein, hydraulic fluid within the chamber 14 will be transfer between the upper and lower ends of the cylinder 12 and between the chamber 14 and the fluid reservoir 36, whereby to dampen relative movement between the sprung portion of the associated vehicle and the unsprung portion thereof. Toward this end, the piston 16 is provided with a new and improved tunable hydraulic valve assembly, generally designated 46 and described in detail below, for selectively controlling the flow of hydraulic fluid between the upper and lower ends of the chamber 14 during the reciprocal movement of the piston rod 18, as described below.

The shock absorber piston 16 comprises a generally cylindrically shaped piston body 48 that is formed with a central axially extending bore 50 within which a reduced diameter end portion 52 of the piston rod 18 is received. The lower or underside of the piston body 48 is formed with an enlarged diameter recess or counterbore 54 within which a threaded nut or similar type fastening element 56 is threadably received upon the end portion 52 to retain the piston body 48 upon the piston rod 18. The piston body 48 is formed with first and second sets of axially extending circumferentially spaced flow ports 58 and 60, with each of the sets of flow ports 58 and 60 preferably comprising four circumferentially spaced ports and with the second set of ports 60 being placed radially outwardly from and circumferentially arranged relative to the first set of flow ports 58. Disposed within the counterbore 54 and extending axially downwardly therein is an annular lower valve seat 62 which is spaced radially outwardly from the inner set of flow ports 58 and radially inwardly from the outer set of flow ports 60. The valve seat 62 defines a generally radially extending seating surface 64 which is adapted to be selectively engaged by the upper side of the tunable valve assembly generally designated 46, described in detail below.

A helical coil spring 66 is arranged concentrically of the nut 56 and is supported at the lower end thereof by a radially outwardly extending flange 68 on the lower end of the nut 56. The upper end of the spring 66 bears against a spring retainer 70 which in turn acts against the underside of various elements of the tunable valve assembly 46 as described below. As will be appreciated by those skilled in the art, at such time as the piston body 48 moves upwardly within the working chamber 14 of the pressure cylinder 12, fluid will flow downwardly through the first, inner set of flow ports 58, thereby forcing fluid through the tunable valve assembly 46, in a manner described below, whereby fluid may flow from the flow portions, between the seating surface 64, and the valve assembly 46, into the lower end of the working chamber 14.

As best seen in FIG. 2B, the upper end of the piston body 48 is formed with a pair of concentrically oriented axially upwardly extending annular valve seats 72 and 74. Valve seat 72 extends around the outer periphery of the upper end of the piston body 48 at a position radially outwardly from the second, outer set of flow ports 60. The valve seat 74 is disposed generally axially above the valve seat 62 and extends axially upwardly from the piston body 48 at a position spaced radially inwardly from the flow ports 60. The valve seats 72 and 74 define generally radially disposed seating surfaces 76 and 78, respectively, which are adapted to be selectively sealingly engaged by means of a generally flat valve disk 80 that is disposed directly above the piston body 48. A spring disk 82 urges valve disk 80 into sealing engagement with the seating surfaces 76 and 78 and a suitably apertured piston retaining washer 84 is disposed above the spring disk 82. An annular rebound bumper 86 may be disposed adjacent the upper surface of retaining washer 84 and circumferentially disposed upon piston rod 18. During downward movement of the piston 16 within the working chamber 14, hydraulic fluid will pass upwardly through the flow ports 60 and deflect the outer periphery of valve disk 80 against the bias of spring disk 82 and thereafter pass into the upper end of the working chamber 14.

As best seen in FIGS. 3, 4A and 4B, the novel tunable hydraulic valve assembly 46 includes an annular first valve disk 88. First valve disk 88 is an apertured disk element, having a first set of axially extending flow ports 90 and a second set of axially extending flow ports 92. Disk 88 is circumferentially disposed upon a sleeve 94 which in turn is circumferentially disposed upon end portion 52 of the piston rod 18. The first set of flow ports 90 is disposed upon first valve disk 88 at a position radially outwardly from the inner circumference of this annual valve disk 88. The second set of flow ports 92, which is circumferentially spaced on the outer circumference of valve disk 88, is disposed radially outwardly from and circumferentially arranged relative to the first set of flow ports 90. The relative configuration of first valve disk 88 is such that an intermediate portion 96 of valve disk 88 located between first flow port 90 and second flow port 92 partially overlaps both flow port 58 and lower valve seat 62, the upper surface of intermediate portion 96 bearing against seating surface 64. Likewise, first flow port 90 is in direct communication with flow port 58.

Tunable hydraulic valve assembly 46 also includes a second annular valve disk 98 disposed adjacent to and immediately below first valve disk 88. Second valve disk 98 is circumferentially disposed upon sleeve 94 and is of a size and configuration such that its upper surface completely occludes flow port 90 and bears against the lower surface of intermediate portion 96, when second valve disk 98 is in an undeflected state as shown in FIG. 3.

An annular spacer 100 is disposed below and adjacent to second valve disk 98 and is also circumferentially disposed upon sleeve 94. Spacer 100 is of lesser radial length relative to second valve disk 98. An annular backing disk 102 is also circumferentially disposed upon sleeve 94 below and adjacent to spacer 100. Backing disk 102 is of sufficient radial length and configuration to extend beyond the outer circumference of spacer 100 such that the lower surface of backing disk 102 can bear upon a first intermediate horizontal surface 104 on spring retainer 70 formed by a cavity 106 in spring retainer 70.

A radial seal 108 is also circumferentially disposed upon sleeve 94 at a position upon sleeve 94 which is some relatively small axial distance away from, and below, the lower surface of backing disk 102. Radial seal 108 is made of a suitable material and may preferably be coated with Teflon. As shown in FIG. 4A, radial seal 108 is also positioned so that it bears against a second intermediate horizontal surface 110 on spring retainer 70 when the shock absorber 10 is in a relatively low mode of hydraulic fluid flow.

In operation, when the piston body 48 moves upwardly in cylinder 12, the flow of hydraulic fluid is downward from the upper end of working chamber 14, through valve assembly 46 and into the lower portion of chamber 14 when the flow of hydraulic fluid downwardly through valve assembly 46 is at a relatively low rate, correlative to a first selected range of fluid pressure differentials between upper and lower ends of chamber 14, as shown in FIG. 4A in which arrows depict the route of fluid flow, fluid passes through first flow port 90 in first valve disk 88 and deflects second valve disk 98 downwardly. This in turn allows fluid flow to continue into cavity 106, through second flow port 92, and then into the lower portion of chamber 14 below the piston body 48. As seen in FIG. 4A, in this relatively low fluid flow mode, backing disk 102 bears against first intermediate horizontal surface 104 thus sealing cavity 106 and directing hydraulic fluid flow from cavity 106 through second flow port 92 and into the lower portion of chamber 14.

FIG. 4B, also with fluid flow arrows, best illustrates the operation of valve assembly 46 when the fluid flow is at a given relatively higher rate than that illustrated in FIG. 4A. As known to those skilled in the art, such given higher rate of fluid flow reflects a relatively greater fluid pressure differential between the upper end of the working chamber 14 and its lower end. Accordingly, valve assembly 46 may be tuned to respond as described below, in response to a chosen range of such fluid pressure differentials.

Under such conditions of relatively higher fluid flow rate, hydraulic fluid flows not only through first flow port 90 deflecting second valve disk 98, but also exerts sufficient pressure against intermediate portion 96 of first valve disk 90 that the upper surface of portion 96 is deflected out of contact with seating surface 64 of valve seat 62. At the same time, fluid flow into cavity 106 exerts a downward pressure against first intermediate horizontal surface 104 of spring retainer 70. Further, the downward deflection of first valve disk 88 during this relatively higher mode of fluid flow urges the outer peripheral portion of valve disk 88 against an upper horizontal surface 112 of spring retainer 70. The combined pressure exerted against first intermediate horizontal surface 104 and upper horizontal surface 112 of spring retainer 70 is sufficient to urge spring retainer 70 downwardly against the bias of coil spring 66.

Figure 5:
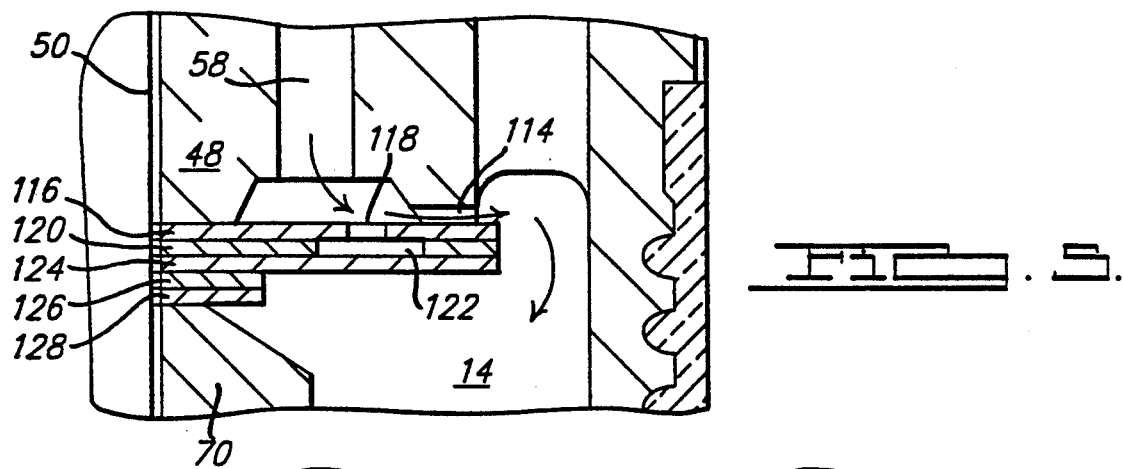
FIG. 5 is an enlarged cross-sectional view of an alternative embodiment of the hydraulic valve assembly of the present invention showing hydraulic fluid flow in a relatively low fluid flow mode.

FIG. 5 shows an alternative embodiment of the tuneable hydraulic valve assembly 46 of the present invention wherein lower valve seat 62 is provided with a bleed port 114. In this embodiment, valve assembly 46 includes an annular first valve disk 116 having a flow port 118 disposed at a position radially outward from the inner circumference of apertured valve disk 116.

Figures 6, 7:
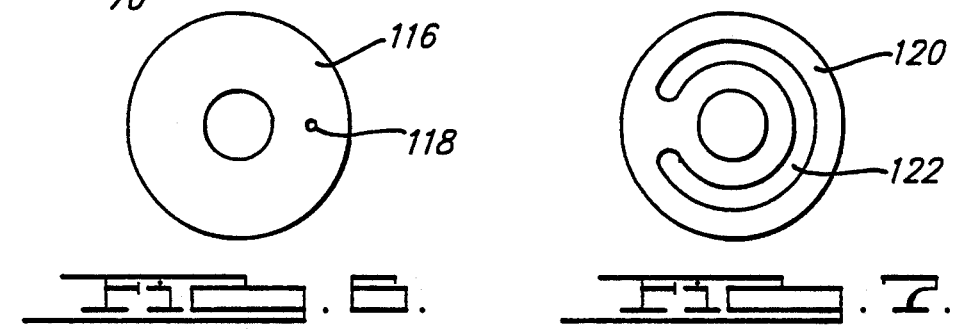
FIG. 6 is an enlarged top view of one valve disk of the hydraulic valve assembly of the present invention.
FIG. 7 is an enlarged top view of another valve disk of the hydraulic valve assembly of the present invention.

The inner circumference of first valve disk 116 is located adjacent to and in slidable relationship with piston rod 18 and abutting relationship with the lower surface of the central portion of piston body 48. As best seen in FIG. 6, valve disk 116 is annular and apertured having a single flow port 118, although in other applications, there may be a plurality of such flow ports 118.

Valve assembly 46 in this embodiment also includes a second valve disk 120 which has a flow port 122 disposed therein. As seen FIG. 7, second valve disk 120 is also apertured and annular in shape and flow port 122 is a generally circular groove disposed at some radial distance from the inner circumference of valve disk 120. As seen in FIG. 5, second valve disk 120 is located adjacent to and in slidable relationship with piston rod 18 and in abutting relationship with the lower surface of first valve disk 116 such that flow port 118 is in direct communication with flow port 122.

In this embodiment, valve assembly 46 also includes an annular backing disk 124 which is located adjacent to and in slidable relationship with piston rod 18 and in abutting relationship with the lower surface of second valve disk 120. In this embodiment, backing disk 124 is not provided with any flow ports. FIG. 5 also illustrates that this embodiment of valve assembly 46 also includes a first annular spacer 126 located adjacent to and in slidable relationship with piston rod 18 and in abutting relationship with the lower surface of backing disk 124, and includes a second annular spacer 128 also located adjacent to and in slidable relationship with piston rod 18 and in abutting relationship with the lower surface of spacer 124. The lower surface of second spacer 128 is in abutting relationship with an upper surface of spring retainer 70. Those skilled in the art will appreciate that the number of spacers may vary yet stay within the scope of the invention.

FIG. 5 illustrates the operation of this embodiment of the valve assembly 46 when the piston 10 is under no compressive load or relatively insignificant compressive load, in which case, the fluid pressure differential between the upper and lower portions of working chamber 14 is within a range between zero and a relatively minor quantity, as chosen by one skilled in the art to effect the desired tuned characteristic. In such condition, hydraulic fluid passes through flow port 58 in piston body 48, then passes through bleed port 114 and into the lower portion of chamber 14.

Figure 8A:
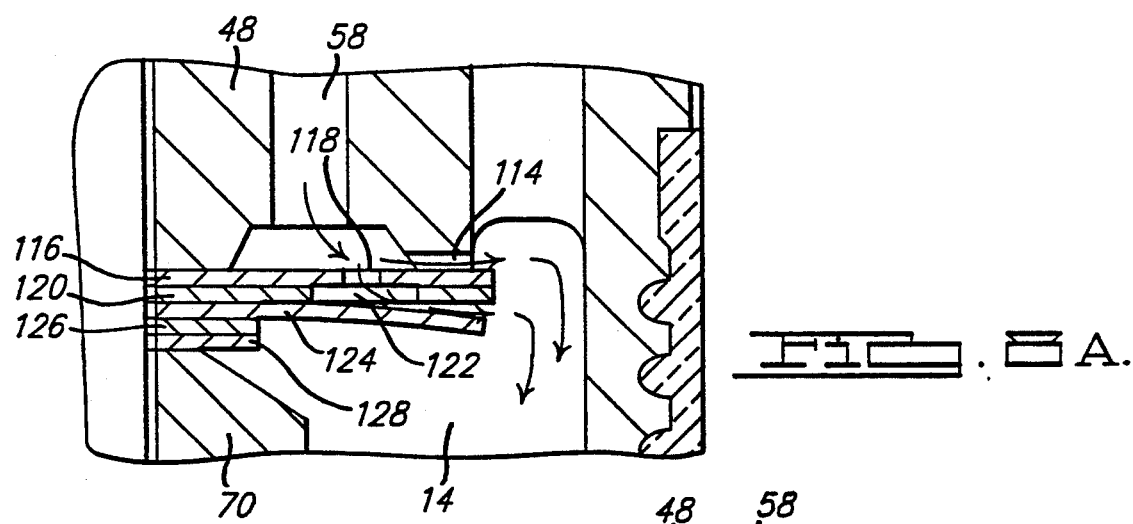
FIG. 8A is an enlarged cross-sectional view of the alternative embodiment of the valve assembly of FIG. 5 which illustrates fluid flow at a relatively moderate fluid flow rate greater than that shown in FIG. 5.

FIG. 8A shows the operation of this same embodiment of valve assembly 46 when piston 10 is under a relatively moderate compressive force greater than that shown in FIG. 5. When the piston 10 is under such relatively moderate compressive force, within a range of relatively moderate fluid pressure differentials as chosen to achieve a desired tuned characteristic, hydraulic fluid passes through flow port 58 in piston body 48 from where it passes not only through bleed port 114, but also through flow port 118 in first valve disk 116 and through flow port 122 in second valve disk 120 with sufficient pressure to deflect backing disk 124. As shown in FIG. 8A, hydraulic fluid passing through both these routes thus enters the lower portion of chamber 14.

Figure 8B:
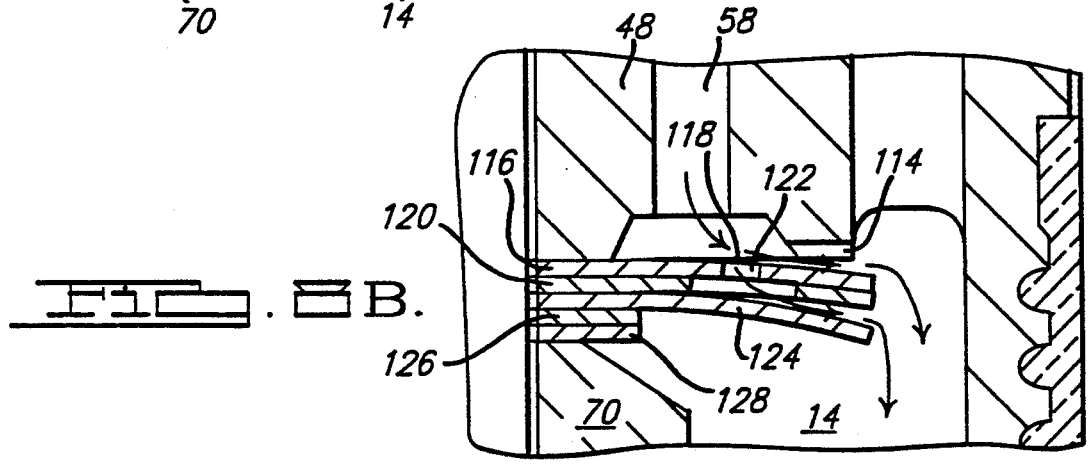
FIG. 8B is an enlarged cross-sectional view of the valve assembly of FIG. 5 illustrating the operation of the valve assembly at a relatively high rate of fluid flow greater than that shown in FIG. 8A.

FIG. 8B shows the operation of this embodiment of valve assembly 46 when the piston 10 is undergoing a relatively high compressive force greater than that shown in FIG. 8A, within a concurrent chosen range of relatively greater fluid flow differentials than that range associated with the condition illustrated in FIG. 8A.

When piston 10 is under such relatively high compressive force, hydraulic fluid passes through flow port 58 with sufficient pressure to bear against first valve disk 116 so as to deflect both disk 116 and second valve disk 120. That portion of hydraulic fluid which flows through flow port 118 and flow port 122 also has sufficient force to deflect backing disk 124. As shown in FIG. 8B, fluid thus passes from the upper portion of chamber 14 through flow port 58 and then through valve assembly 46 via two routes, ending in the lower portion of chamber 14. The first of these two routes is the opened gap between the outer periphery of first valve disk 116 and the seating surface 64 of lower valve seat 62. It will be noted that fluid passing through this gap between seating surface 64 and the outer periphery of first disk 116 is contiguous with fluid flowing through bleed port 114. The second route of fluid flow through this embodiment of valve assembly 46 under this relatively high compressive force is through flow port 118 and flow port 122, deflecting backing disk 124 and creating a gap between the lower surface of the outer periphery of second valve disk 120 and the upper surface of the outer periphery of backing disk 124.

Figure 9A:
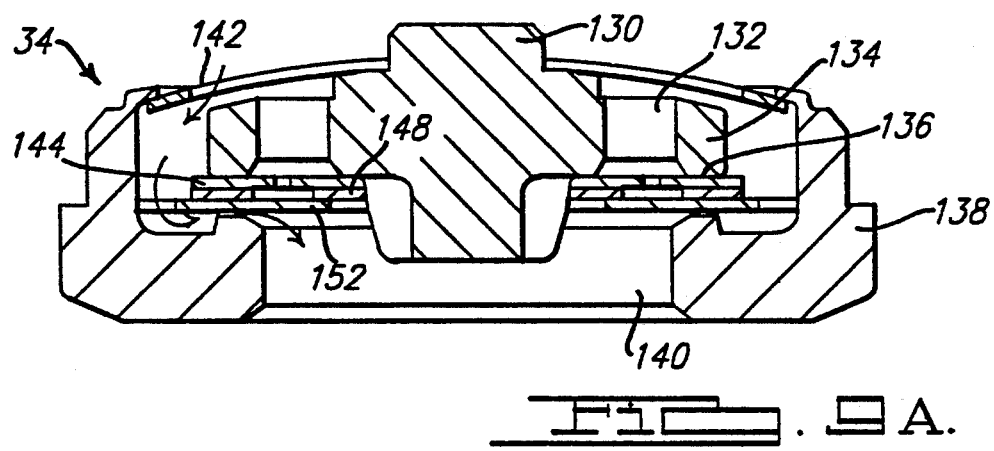
FIG. 9A is an enlarged cross-sectional view of the base valve assembly in lower portion of the shock absorber illustrated in FIG. 2B, the base valve assembly being adapted to embody the hydraulic valve assembly of the present invention.

In yet another alternative embodiment of the tunable valve assembly 46 of the present invention, assembly 46 is adapted to be incorporated into base valve assembly 34, which is seen in FIG. 2B to be positioned at or near the bottom of chamber 14 and generally centered within cylinder 12. In this embodiment, base valve assembly 34, as is better seen in FIG. 9A, includes an upper base valve member 130 of generally cross-like configuration. Axial portion of cross-shaped member 130 is coaxial with piston rod 18, while the radial portion of the cross-shaped member 130 is provided with axially extending fluid ports 132 disposed at a position radially inward of a valve seat 34 disposed at the circumferential periphery of member 130. A seating surface 136 is provided by the lower surface of valve seat 134. While this present embodiment preferably comprises four axially extending circumferentially spaced flow ports 132, those skilled in the art may choose a different number of flow ports 132 to effectuate their desired application.

Base valve assembly 34 also includes a lower base valve member 138, which is generally annular in shape, with a central bore 140 which allows fluid passing through base valve assembly 34 to communicate with fluid reservoir 36 by means known in the art and not illustrated. Base valve assembly 34 also includes an annular finger spring 142 which extends from the axial portion of cross-shaped upper base valve member 130 to axially upwardly extending portions of lower base valve member 138.

Figure 9B:
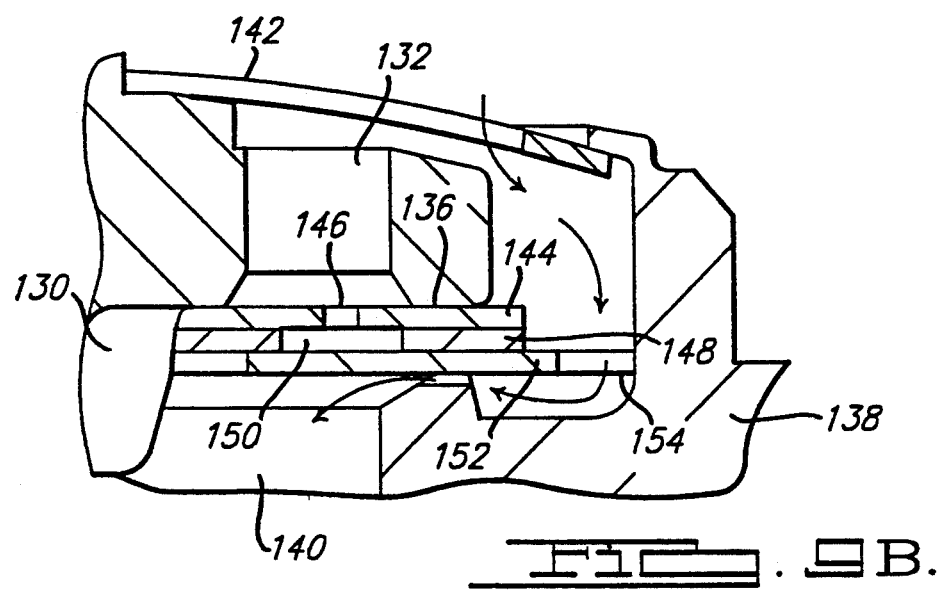
FIG. 9B is an enlarged cross-sectional view of a portion of the valve assembly of FIG. 9A.
Figure 11:
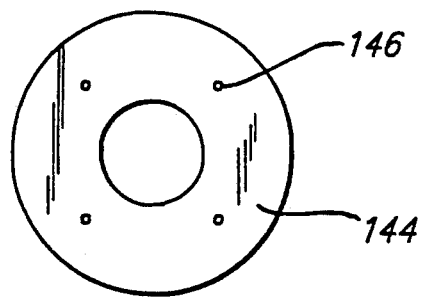
FIG. 11 is an enlarged top view of a valve disk of the valve assembly of the present invention as embodied in FIG. 10A.

As seen in FIG. 9B, in this alternative embodiment, tunable valve assembly 46 includes a first apertured valve disk 144 having a set of flow ports 146. As best seen in FIG. 11, apertured valve disk 144 is annular and, in this embodiment, flow ports 146 are four in number, although those skilled in the art will appreciate that the number of flow ports 146 may vary according to the desired application. FIG. 9B shows that first valve disk 144 is disposed adjacent to upper base valve member 130, with the central bore of disk 144 bearing against and in slidable relationship to a vertical face of base valve member 130. First valve disk 144 is of sufficient diameter that its annular body traverses flow port 132 in base valve member 130, with flow port 146 in direct alignment with flow port 132. Furthermore, the upper surface of the outer peripheral portion of first valve disk 144 bears against seating surface 136.

Figure 12:
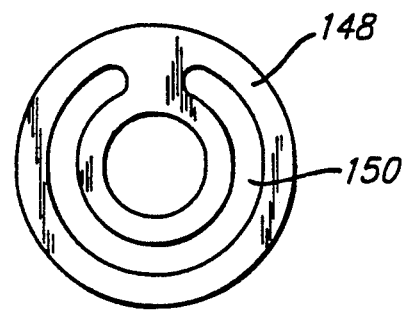
FIG. 12 is an enlarged top view of another valve disk of the valve assembly of the present invention as embodied in FIG. 10A.

This embodiment of base valve assembly 46 also includes a second apertured valve disk 148 with its own pressure port 150. As best seen in FIG. 12, second valve disk element 148 is annular in configuration and pressure port 150 is a generally circular groove located in the annular body of valve disk 148. Those skilled in the art will appreciate that the size and configuration of pressure port 148 may be varied according to the desired application. Second valve disk 148 is disposed adjacent and in slidable relationship with a vertical portion of upper base valve member 130. Second valve disk 148 is also disposed below and adjacent to first valve disk 144 such that the upper surface of the former bears against the lower surface of the latter. Furthermore, pressure port 150 of second valve disk 148 is in direct alignment with flow port 146 of first disk element 144.

Figure 13:
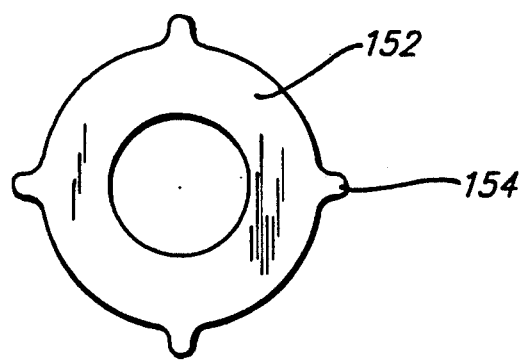
FIG. 13 is an enlarged top view of yet another valve disk of the valve assembly of the present invention as embodied in FIG. 10A.

This embodiment of valve assembly 46 also includes a backing disk 152, as shown in FIG. 13, which is generally annular in configuration. In this embodiment, the circumferential periphery of backing disk 152 is provided with four extending tabs 154 which are equally circumferentially spaced upon backing disk 152. As seen in FIG. 9B, tabs 154 bear against a vertical portion of lower base valve member 138 and one skilled in the art will appreciate that the number and circumferential area of tabs 154 which contact member 138 may vary according to the chosen application. As is best seen in FIG. 9B, backing disk 152 is disposed directly below and adjacent second valve disk 148 such that the upper surface of backing disk 152 bears against the lower surface of valve disk 148. The internal bore of backing disk 152 is of a diameter such that its inner circumference is greater than the external circumference of that vertical portion of upper base valve member 130 nearest backing disk 152. Further, the diameter of the central bore of backing disk 152 is of such length that the inner peripheral portion of the annular body of backing disk 152 overlaps and bears against that portion of second valve disk 148 which is radially inward of flow port 150. In this manner, the lower opening of pressure port 150 is completely occluded by the annular body of backing disk 152. Backing disk 152 is also disposed upon the portion of lower base valve member 138 which is immediately axially outward of central bore 140, in sealed relationship therewith.

Figure 10A:
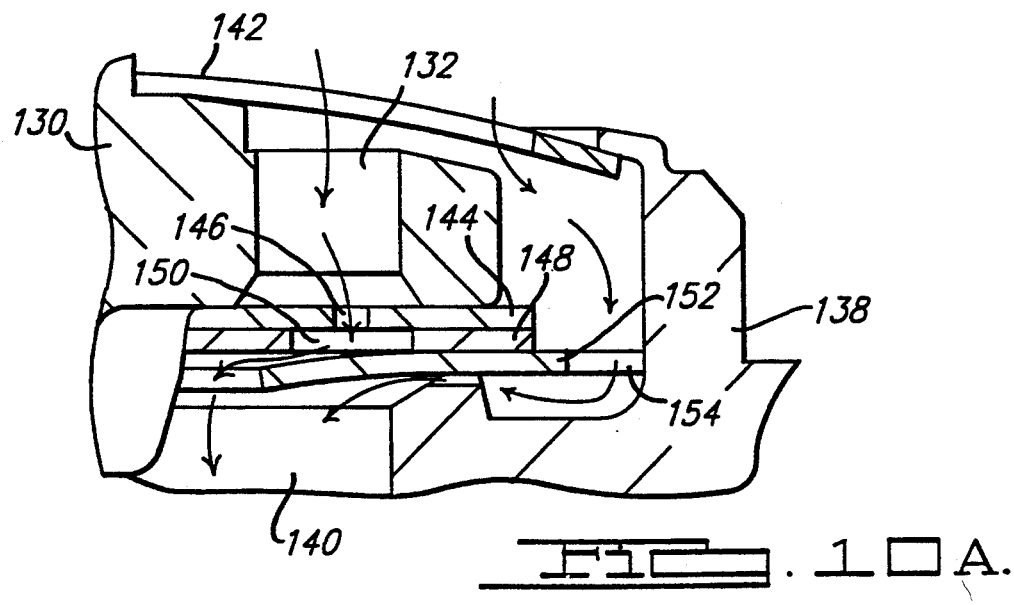
FIG. 10A is an enlarged cross-sectional view of the very low flow valve assembly shown in FIG. 9B illustrating operation of the valve assembly in a mode of moderately low fluid flow.

In operation, under a relatively low rate of flow of hydraulic fluid through base valve assembly 34 as shown in FIG. 10A, characterizing a range of relatively low fluid pressure differentials between upper and lower ends of working chamber 14, hydraulic fluid flows through finger spring 142 and through flow port 132 in upper base valve member 130. This fluid then flows through flow port 146 in first valve disk 144, pressurizes port 150 in second valve disk 148 and deflects the inner peripheral of backing disk 152, opening a gap between its upper surface and the lower surface of that portion of second valve disk 148 which is radially inward of pressure port 150. The fluid thus passes through this gap, through the central bore of backing disk 152 and into central bore 140 of lower base valve member 138, then flowing to the outer fluid reservoir 36.

Figure 10B:
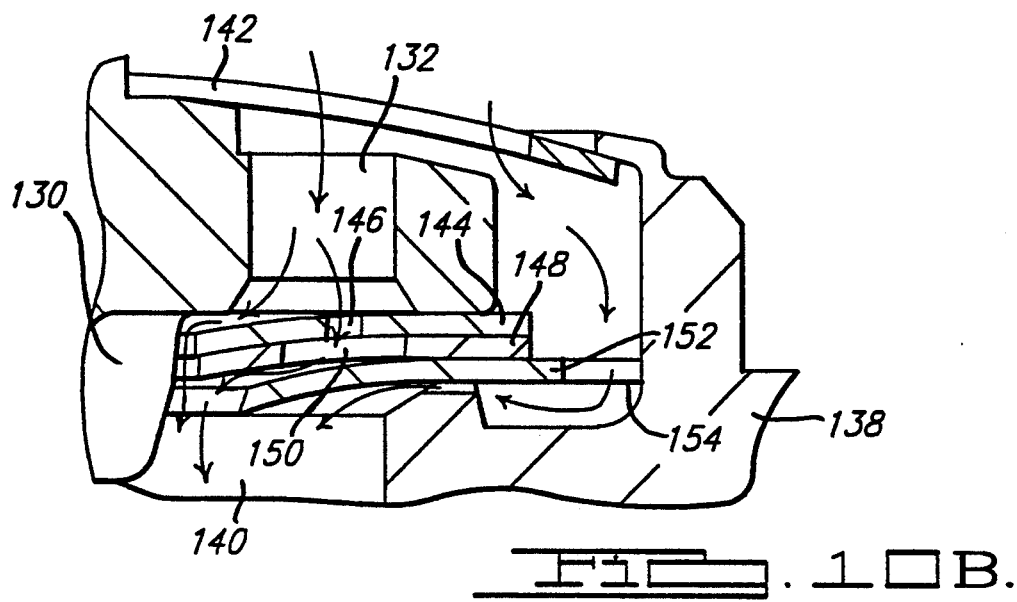
FIG. 10B is an enlarged cross-sectional view of the valve assembly shown in FIG. 9B illustrating operation of the valve assembly in a mode of relatively high fluid flow.

FIG. 10B illustrates the fluid flow through base valve assembly 34 and this alternative embodiment of tunable valve assembly 46 when the flow of hydraulic fluid is relatively high compared to the fluid flow illustrated in FIG. 10A, characterizing a range of relatively higher fluid pressure differentials between ends of working chamber 14. Under this relatively higher fluid flow condition, fluid passing through flow port 132 exerts sufficient pressure against the inner periphery of first valve disk 144 to deflect both the inner peripheries of valve disk 144 and second valve disk 148, opening a gap between both these respective inner peripheries and the lower flow channels of that portion of upper base valve member 130 upon which disks 144 and 148 are slidably disposed. Hydraulic fluid thus passes through this gap, through the central bore of backing disk 152 and into central bore 140 of lower base valve member 138. At the same time, additional hydraulic fluid passes through flow ports 146 and 150, through the central bore of backing disk 152 and into central bore 140, in the manner described above in the context of explaining the operation shown in FIG. 10A.

It will be appreciated by those skilled in the art that for a chosen ride characteristic of shock absorber 10 for a given automotive vehicle, hydraulic valve assembly 46, whether disposed within piston 16 or within base valve assembly 34, may be tuned by selecting appropriate quantities, sizes, and configurations of flow ports. Likewise, a second desired ride characteristic for this same vehicle can be achieved by a different tuning of valve assembly 46, in turn achieved by selecting different numbers, sizes, and configurations of flow ports. In this manner, valve assembly 46 of the present invention can be tuned to provide a first fluid flow path through valve assembly 46 responsive to a first selected range of fluid flow pressure differentials between different portions of shock absorber 10 and to provide subsequent additional flow paths responsive to subsequent selected ranges of fluid pressure differentials.

While it will be apparent that the preferred embodiments illustrated herein are well calculated to fulfill the objects above stated, it will be appreciated by one skilled in the art that the present invention is susceptible to modification, variation, and change without departing from the scope of the invention.

What is claimed is:

1. A direct acting hydraulic shock absorber comprising:
   a pressure cylinder having a piston reciprocably disposed therein, said piston defining upper and lower ends of said pressure cylinder,
   a reserve tube coextensive of and surrounding said pressure cylinder and defining a fluid containing reservoir therein,
   upper and lower generally cup-shaped end caps closing the opposite ends of said reservoir,
   valve means adjacent said lower end cap for controlling fluid flow between said pressure cylinder and said reservoir,
   said piston having a valve assembly disposed at one end thereof, said valve assembly being variably responsive to a plurality of selected ranges of fluid pressure differentials between said upper and lower ends to provide a plurality of fluid flow paths between said upper and lower ends, said valve assembly having a first deflectable apertured valve disk, a second deflectable apertured valve disk and a hydraulic fluid bleed port,
   wherein a first range of selected fluid pressure differentials causes fluid to flow along a first fluid flow path through said bleed port, a second selected range of fluid pressure differentials provides a second fluid flow path through the respective apertures of said first and second valve disks, and a third selected range of fluid pressure differentials deflects both said first and second valve disks providing a third fluid flow path.

2. The direct acting hydraulic shock absorber of claim 1 wherein progressively larger fluid pressure differentials between said upper and lower ends cause an increase in the flow of fluid between said upper and lower ends.

3. The direct acting hydraulic shock absorber of claim 2 wherein said valve assembly comprises a deflectable backing disk in abutting relationship with said first deflectable apertured valve disk, whereby said second range of fluid pressure differentials deflects said backing disk providing said second fluid flow path through apertures of said first apertured valve disk and said second range of fluid pressure differentials greater than said first range of fluid pressure differentials deflects both said backing disk and said first apertured valve disk providing said third fluid flow path.

4. A direct acting hydraulic shock absorber comprising:
   a pressure cylinder having a valved piston reciprocably disposed therein,
   a reserve tube coextensive of and surrounding said pressure cylinder and defining a fluid-containing reservoir therein,
   upper and lower generally cup-shaped end caps closing the opposite ends of said reservoir,
   valve means adjacent said lower end cap for controlling fluid flow between said pressure cylinder and said reservoir,
   said valve means comprising a valve assembly having a plurality of deflectable apertured valve disks including a first deflectable apertured valve disk and a second deflectable apertured valve disk, said valve assembly being variably responsive to selected ranges of fluid pressure differentials between said pressure cylinder and said reserve tube to provide a plurality of fluid flow paths between said pressure cylinder and said reservoir,
   wherein a first selected range of fluid pressure differentials deflects said backing disk providing a first fluid flow path through the respective apertures of said first valve disk and said second valve disk and a second selected range of fluid pressure differentials deflects both said first valve disk and said second valve disk providing a second fluid flow path through said valve assembly.

5. The direct acting hydraulic shock absorber of claim 4 wherein progressively larger fluid pressure differentials causes an increase in the flow of fluid through said valve.

6. A method for controlling the flow of hydraulic fluid from an upper end of a pressure cylinder of a shock absorber, through a reciprocable piston disposed therein, into a lower end of said pressure cylinder, said method comprising the steps of:
   providing a tunable valve assembly disposed upon said piston, and
   providing a plurality of fluid flow paths through said tunable valve assembly defined in part by a plurality of apertured deflection valve disks including a first deflatable apertured valve disk, a second deflectable apertured valve disk and a backing disk;

deflecting said backing disk so as to provide a first fluid flow path through the respective apertures of said first deflectable apertured valve disk and said second deflectable apertured valve disk during a first selected range of fluid pressure differentials; and deflecting both said first valve disk and said second valve disks providing a second fluid flow path through said valve assembly during a second selected range of fluid pressure differentials.

7. A method for controlling the flow of hydraulic fluid from a pressure cylinder of a shock absorber, through a base valve assembly, into an outer fluid reservoir of said shock absorber, the method comprising the steps of:

providing a tunable valve assembly disposed upon said base valve assembly, and providing a plurality of fluid flow paths through a tunable valve assembly defined in part by a plurality of apertured valve disks, each of said plurality of flow paths actuating responsive to a different selected range of fluid pressure differentials between said pressure cylinder and said outer fluid reservoir, said step of providing a plurality of fluid flow paths including the step of providing a first deflectable apertured valve disk, a second deflectable apertured valve disk and a hydraulic fluid bleed port, whereby a first range of selected fluid pressure differentials causes fluid to flow along a first fluid flow path through said bleed port, a second selected range of fluid pressure differentials provides a second fluid flow path through the respective apertures of said first and second valve disks, and a third selected range of fluid pressure differentials deflects both said first and second valve disks providing a third fluid flow path.

8. The method of claim 7 wherein:

said tunable valve assembly includes a plurality of deflectable valve disks, at least one of said valve disks being apertured, and said step of providing a plurality of fluid flow paths comprises deflecting a plurality of combinations of said valve disks, each deflecting combination of said valve disks being responsive to a different selected range of fluid pressure differentials between said pressure cylinder and said outer fluid reservoir, at least one of said flow paths including a path through apertures of said valve disks.

* * * * *

UNITED STATES PATENT AND TRADEMARK OFFICE
CERTIFICATE OF CORRECTION

PATENT NO. : 5,325,942

DATED : July 5, 1994

INVENTOR(S) : Gary W. Groves & David J. Boucher

It is certified that error appears in the above-indentified patent and that said Letters Patent is hereby corrected as shown below:

On the Title Page [75] Inventors, "David T. Boucher" should be --David J. Boucher--;

Col. 3, Line 20, "transfer" should be --transferred--;

Col. 3, Line 66, "first," should be --first--;

Col. 4, Line 9, "second," should be --second--;

Col. 6, Line 10, after "seen" insert --in--;

Col. 7, Line 36, "34" should be --134--;

Col. 9, Line 66, Claim 1, "wherein" should be --whereby--;

Col. 10, Line 67, Claim 6, "deflatable" should be --deflectable--; and

Col. 11, Line 21, Claim 7, "actuating" should be --actuated--.

Signed and Sealed this

Eighteenth Day of April, 1995

Attest:

BRUCE LEHMAN

*Commissioner of Patents and Trademarks*

*Attesting Officer*